United States Patent
Maruyama et al.

(10) Patent No.: US 10,606,432 B2
(45) Date of Patent: Mar. 31, 2020

(54) CAPACITANCE TYPE TOUCH PANEL WITH BUILT-IN PRESSURE SENSOR

(71) Applicant: SHARP KABUSHIKI KAISHA, Sakai, Osaka (JP)

(72) Inventors: Takenori Maruyama, Sakai (JP); Yasuhiro Sugita, Sakai (JP); Kazutoshi Kida, Sakai (JP); Shinji Yamagishi, Sakai (JP); Kenshi Tada, Sakai (JP); Jean Mugiraneza, Sakai (JP); Hidetsugu Kawamori, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/310,788

(22) PCT Filed: Aug. 30, 2017

(86) PCT No.: PCT/JP2017/031225
§ 371 (c)(1),
(2) Date: Dec. 17, 2018

(87) PCT Pub. No.: WO2018/043588
PCT Pub. Date: Mar. 8, 2018

(65) Prior Publication Data
US 2019/0317641 A1    Oct. 17, 2019

(30) Foreign Application Priority Data
Aug. 30, 2016    (JP) .................................. 2016-168264

(51) Int. Cl.
*G06F 3/044* (2006.01)
*G01D 5/24* (2006.01)
(Continued)

(52) U.S. Cl.
CPC ............ *G06F 3/0446* (2019.05); *G01D 5/24* (2013.01); *G01L 1/205* (2013.01); *G01L 1/2262* (2013.01); *G06F 2203/04112* (2013.01)

(58) Field of Classification Search
CPC .. G01D 5/24; G01L 1/00; G01L 1/205; G01L 1/2262; G01L 5/00; G06F 3/0445;
(Continued)

(56) References Cited

U.S. PATENT DOCUMENTS

2010/0128002 A1    5/2010 Stacy et al.
2010/0201635 A1    8/2010 Klinghult et al.
(Continued)

FOREIGN PATENT DOCUMENTS

JP    5406944 B2    2/2014
JP    2015-041160 A    3/2015

*Primary Examiner* — Nelson M Rosario
(74) *Attorney, Agent, or Firm* — ScienBiziP, P.C.

(57) ABSTRACT

The present invention simultaneously detects a location of an electric conductor and pressure that is applied by the electric conductor. A touch panel (1) includes a plurality of sensing electrodes (2) that extend in a first direction for detecting a touch location based on an electrostatic capacitance; and pressure detecting electrodes (4) each of which extends in the first direction and is provided between adjacent two of the plurality of sensing electrodes (2). Each of the pressure detecting electrodes (4) has a width smaller than that of each of the sensing electrodes (2) and has resistance that changes in response to applied pressure.

6 Claims, 15 Drawing Sheets

(51) Int. Cl.
*G01L 1/20* (2006.01)
*G01L 1/22* (2006.01)

(58) Field of Classification Search
CPC ......... G06F 3/0446; G06F 2203/04105; G06F 2203/04112
See application file for complete search history.

(56) References Cited

U.S. PATENT DOCUMENTS

2016/0357331 A1* 12/2016 Kano .................... G06F 3/044
2019/0278391 A1*  9/2019 Mizuhashi ............ G06F 3/0416
2019/0339805 A1* 11/2019 Suzuki ................. G06F 3/0416

* cited by examiner

CAPACITANCE TYPE TOUCH PANEL WITH BUILT-IN PRESSURE SENSOR

TECHNICAL FIELD

The present invention relates to a capacitance type touch panel that has a built-in pressure sensor.

BACKGROUND ART

As a conventional technique, a capacitance type touch panel that has a built-in pressure sensor is known (Patent Literature 1). The sensor disclosed in Patent Literature 1 includes (i) an electrode pattern that is made of indium tin oxide (ITO), an electrostatic capacitance measuring device that is configured to connect with the electrode pattern via a contact point and to measure electrostatic capacitance between the electrode pattern and an ambient environment of the electrode pattern, and (iii) a resistance measuring device that is configured to measure resistance between two points in the electrode pattern.

In a case where an electric conductor such as a finger has approached the electrode pattern, the electrostatic capacitance measuring device detects a location of the electric conductor based on change in electrostatic capacitance. Then, the resistance measuring device detects pressure that is applied by the electric conductor based on change in resistance of the electrode pattern which change is caused by pressure applied to the electrode pattern by the electric conductor.

CITATION LIST

Patent Literature

Patent Literature 1 Japanese Patent No. 5406944 (Registration Date: Nov. 8, 2013)

SUMMARY OF INVENTION

Technical Problem

However, according to the conventional technique, the same electrode pattern is used to detect a location of the electric conductor and to detect pressure that is applied by the electric conductor. Therefore, it is necessary to operate, in a time division manner, the electrostatic capacitance measuring device for detecting a location and the resistance measuring device for detecting pressure. This causes a problem that it is impossible to simultaneously detect a location of the electric conductor and pressure that is applied by the electric conductor.

The present invention is accomplished in view of the problem, and its object is to provide a capacitance type touch panel that has a built-in pressure sensor and can simultaneously detect a location of an electric conductor and pressure that is applied by the electric conductor.

Solution to Problem

In order to attain the object, a capacitance type touch panel that has a built-in pressure sensor in accordance with an aspect of the present invention includes: a plurality of touch detecting electrodes that extend in a first direction for detecting a touch location based on an electrostatic capacitance; and pressure detecting electrodes each of which extends in the first direction and is provided between adjacent two of the plurality of touch detecting electrodes, each of the pressure detecting electrodes having a width smaller than that of each of the plurality of touch detecting electrodes and having resistance that changes in response to applied pressure.

Advantageous Effects of Invention

According to an aspect of the present invention, it is possible to bring about an effect of providing the capacitance type touch panel that has a built-in pressure sensor and can simultaneously detect a location of an electric conductor and pressure that is applied by the electric conductor.

BRIEF DESCRIPTION OF DRAWINGS (a) of FIG. 1 is a plan view schematically illustrating a configuration of a touch panel in accordance with Embodiment 1, and (b) of FIG. 1 is a cross-sectional view illustrating the touch panel.

(a) of FIG. 2 is a plan view schematically illustrating a configuration of a sensing layer that is provided in a touch panel in accordance with Comparative Example, and (b) of FIG. 2 is an enlarged view illustrating a part A indicated in (a) of FIG. 2.

(a) of FIG. 3 is a plan view schematically illustrating a configuration of a sensing layer that is provided in the touch panel in accordance with Embodiment 1, and (b) of FIG. 3 is an enlarged view illustrating a part B indicated in (a) of FIG. 3.

Figure 6:
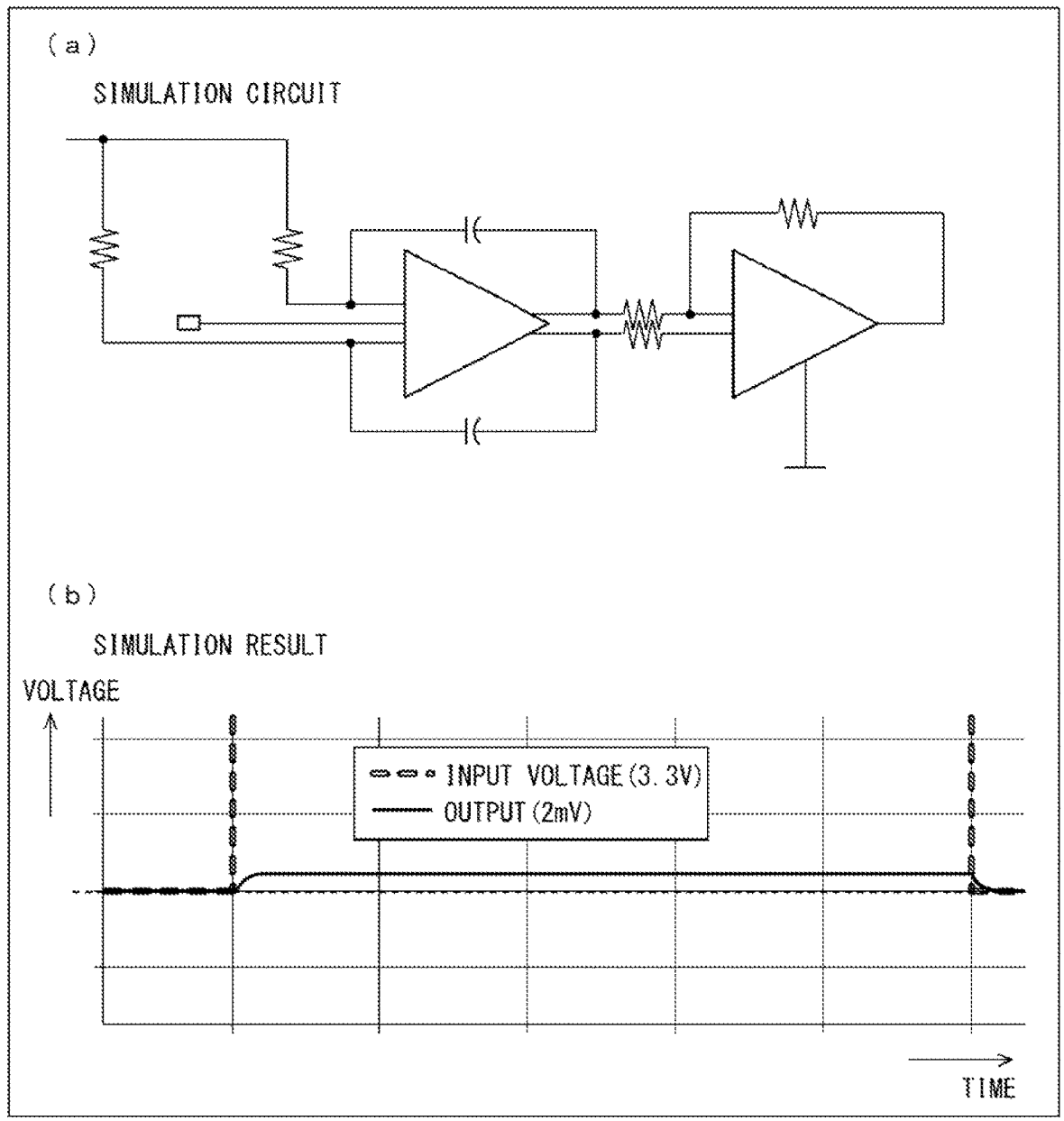

(a) of FIG. 6 is a circuit diagram for simulating change in resistance which change is caused when pressure is applied to the pressure detecting electrode, and (b) of FIG. 6 is a graph showing a result of the simulation.

Figure 7:
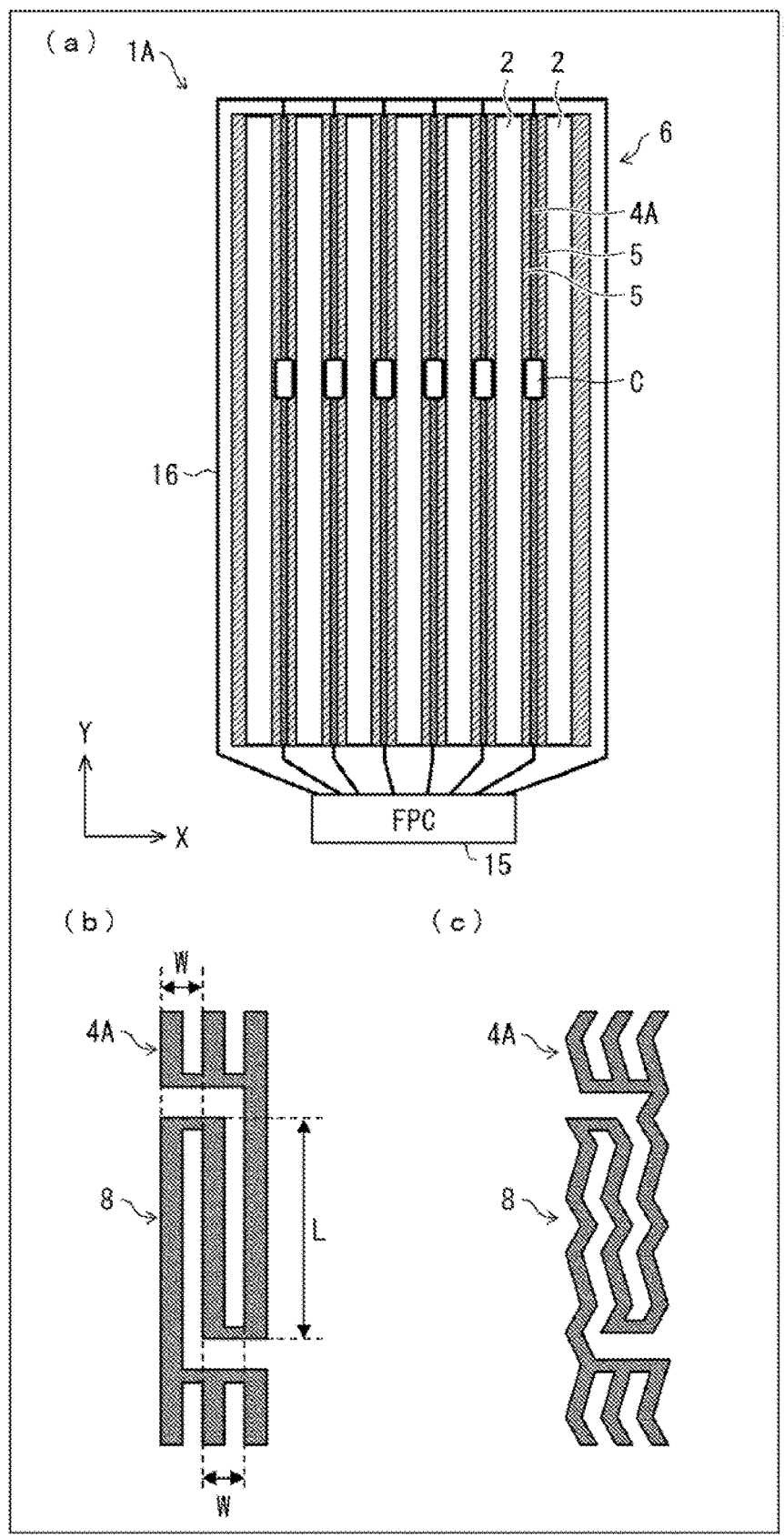

(a) of FIG. 7 is a plan view schematically illustrating a configuration of a sensing layer that is provided in a touch panel in accordance with Embodiment 2, (b) of FIG. 7 is an enlarged view illustrating a configuration of a part C indicated in (a) of FIG. 7, and (c) of FIG. 7 is an enlarged view illustrating another configuration of the part C.

Figure 8:
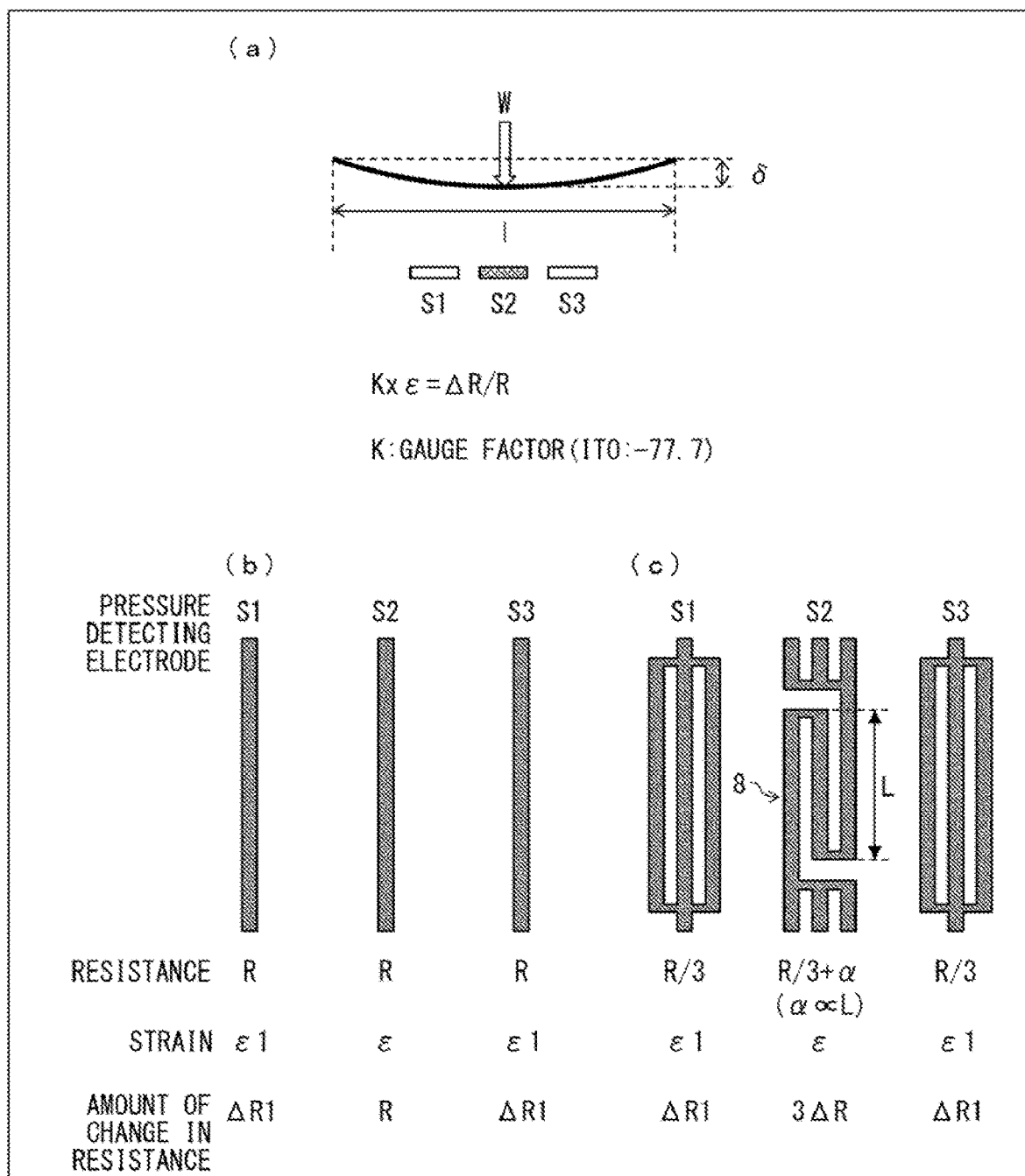

(a) of FIG. 8 is a schematic view illustrating a deformation state of the pressure detecting electrode when a stress is applied to the pressure detecting electrode that is provided in the sensing layer, (b) of FIG. 8 is a view for explaining an amount of change in resistance of the pressure detecting electrode in accordance with Comparative Example, and (c) of FIG. 8 is a view for explaining an amount of change in resistance of the pressure detecting electrode in accordance with Embodiment 2.

Figure 9:
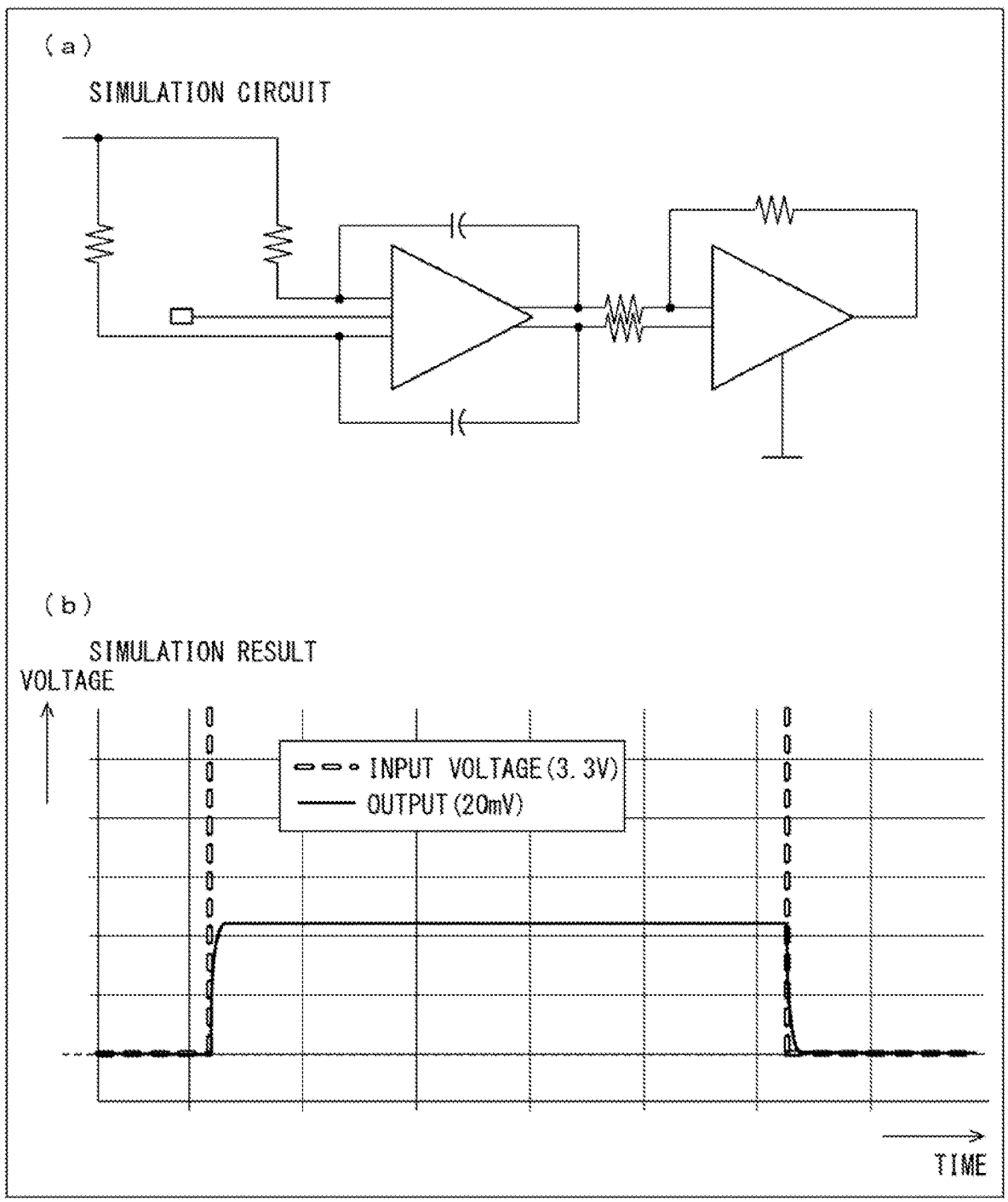

(a) of FIG. 9 is a circuit diagram for simulating change in resistance which change is caused when pressure is applied to the pressure detecting electrode, and (b) of FIG. 9 is a graph showing a result of the simulation.

Figure 10:
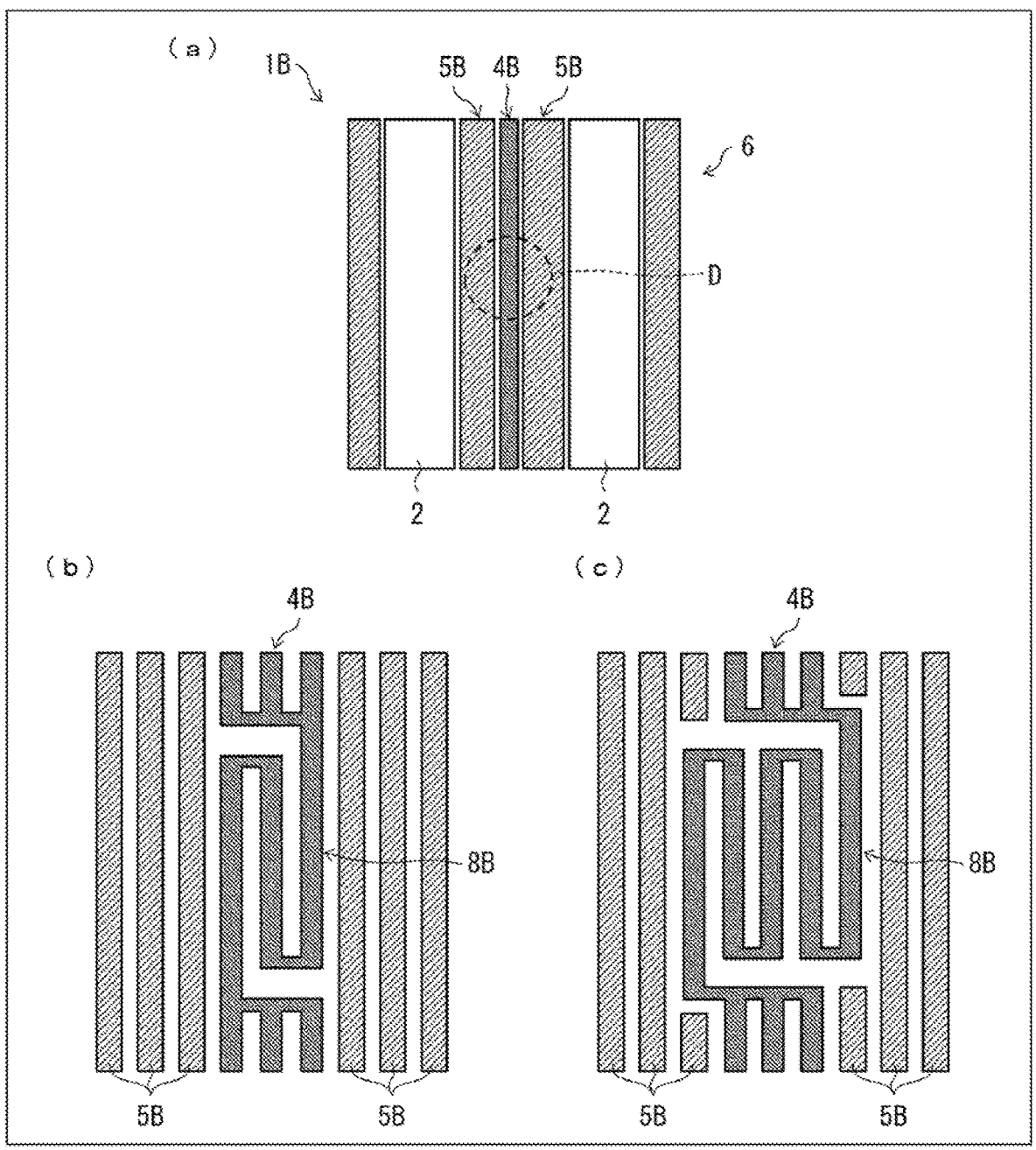

(a) of FIG. 10 is a plan view schematically illustrating a configuration of a sensing layer that is provided in a touch panel in accordance with Embodiment 3, (b) of FIG. 10 is an enlarged view illustrating a configuration of a part D indicated in (a) of FIG. 10, and (c) of FIG. 10 is an enlarged view illustrating another configuration of the part D.

Figure 11:
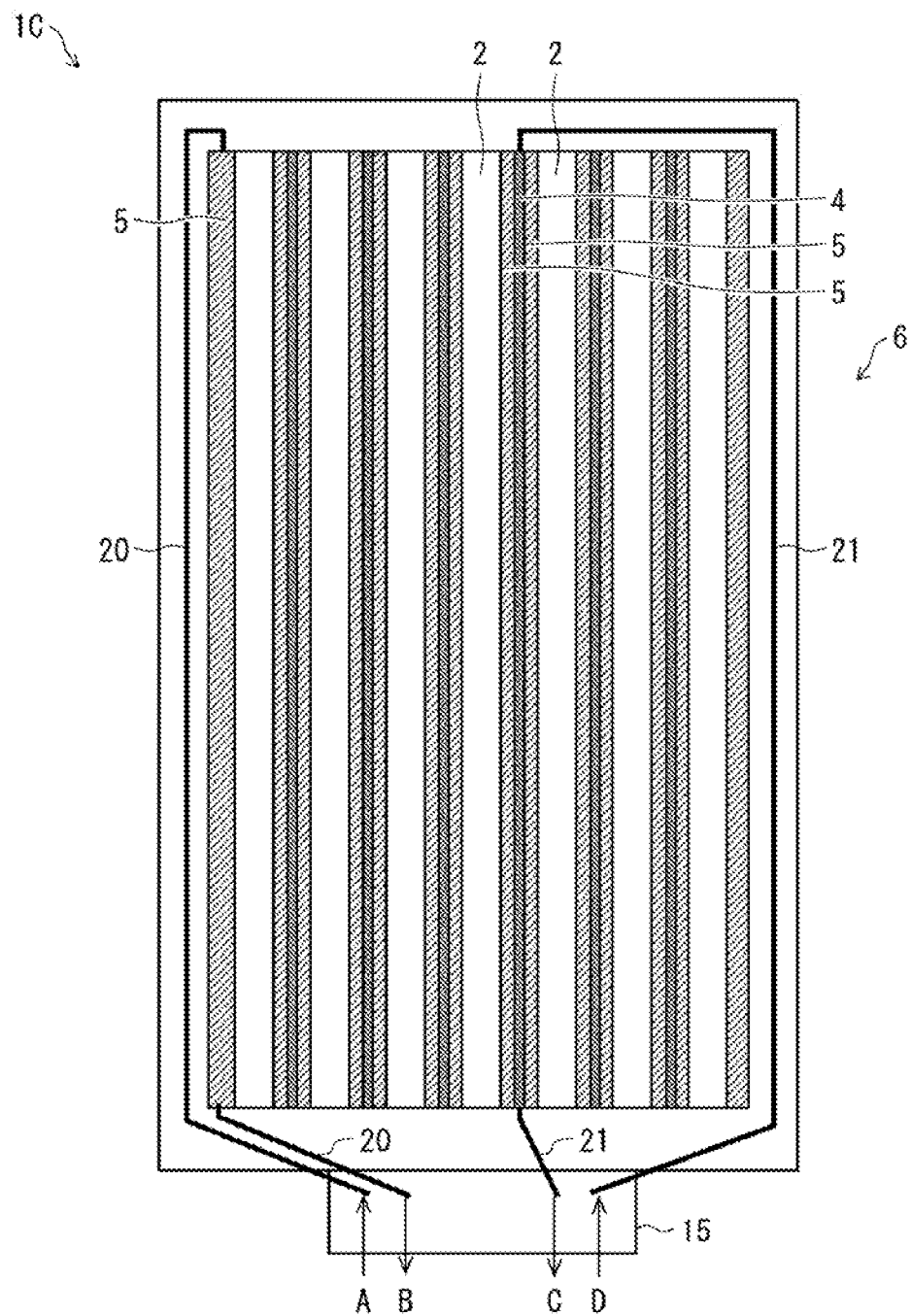

FIG. 11 is a plan view schematically illustrating a configuration of a sensing layer that is provided in a touch panel in accordance with Embodiment 4.

Figure 12:
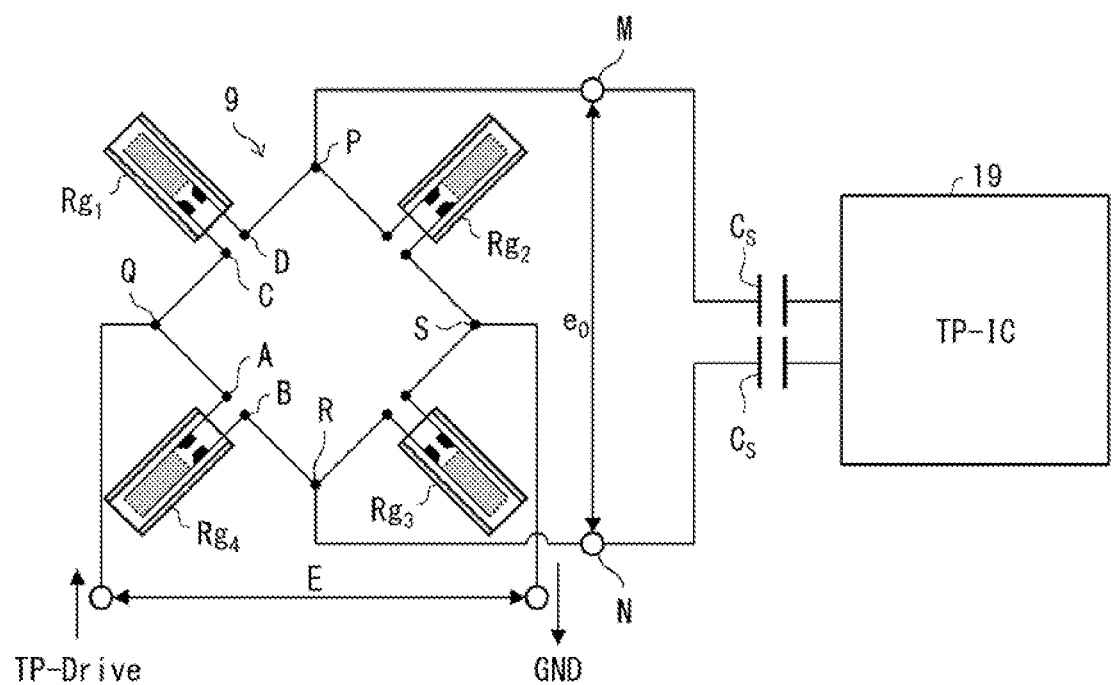

FIG. 12 is a circuit diagram illustrating a configuration of a Wheatstone bridge circuit that is provided in the touch panel.

Figure 13:
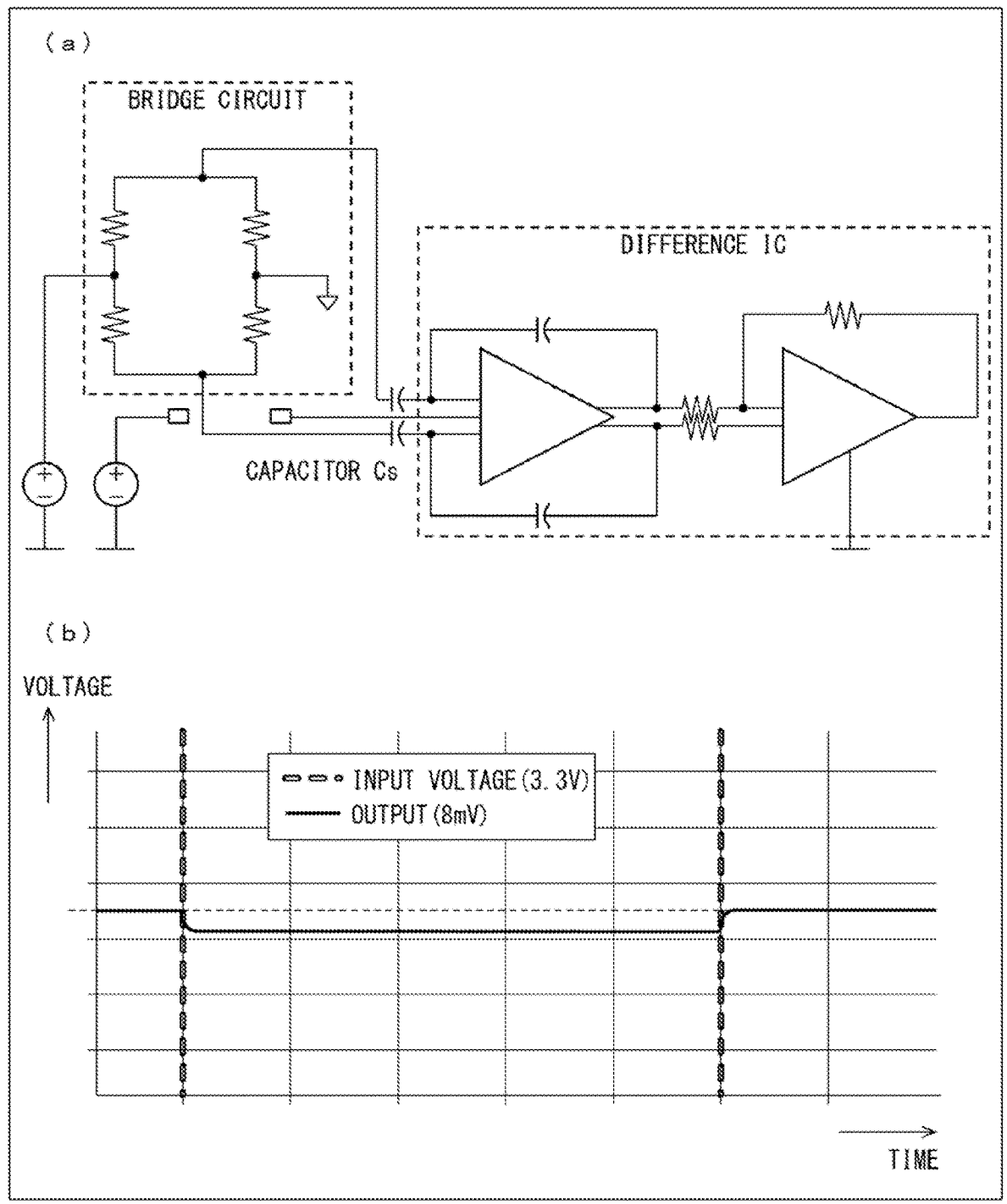

(a) of FIG. 13 is a circuit diagram for simulating change in resistance which change is caused when pressure is applied to a pressure detecting electrode that is provided in the touch panel, and (b) of FIG. 13 is a graph showing a result of the simulation.

Figure 14:
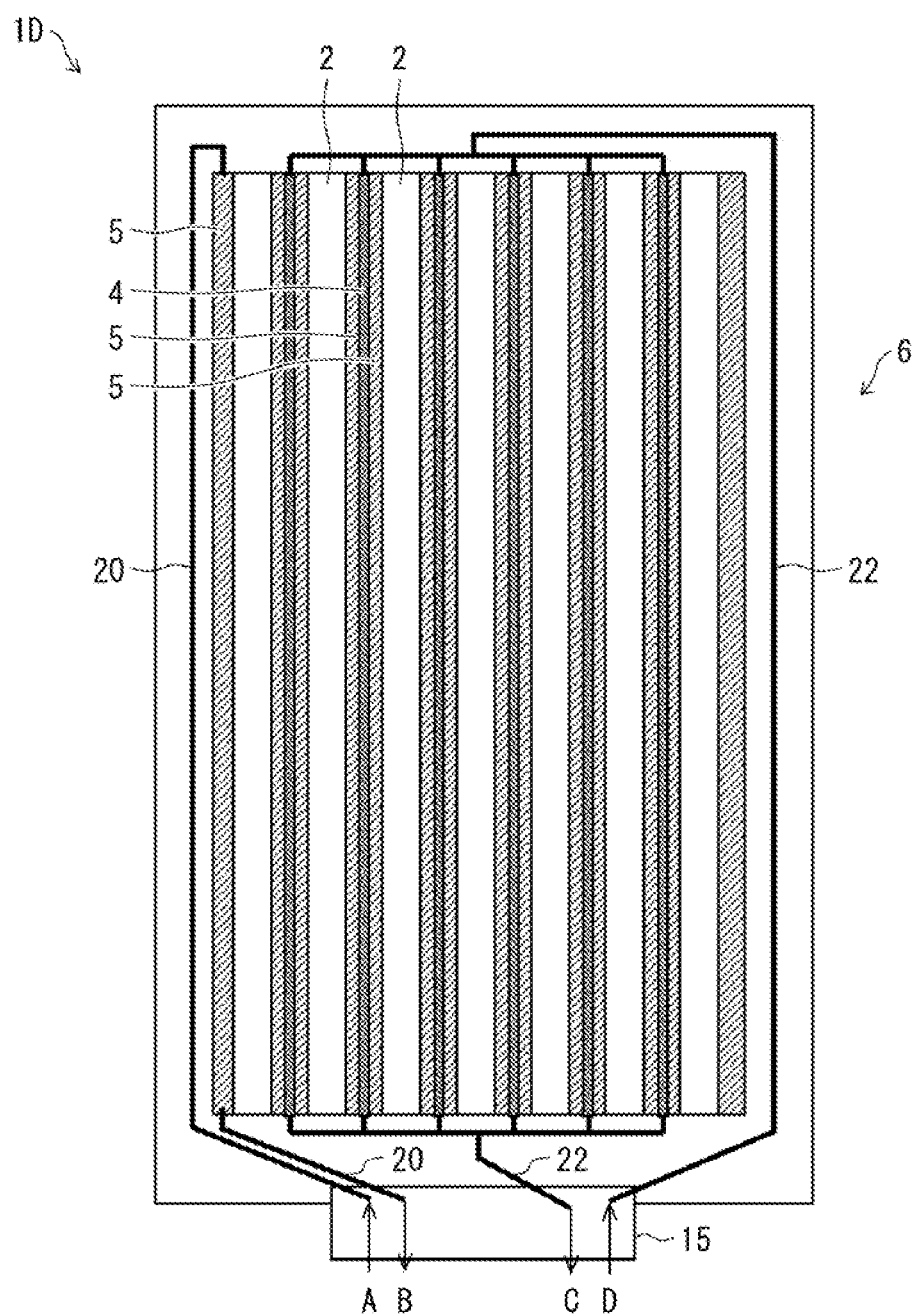

FIG. 14 is a plan view schematically illustrating a configuration of a sensing layer that is provided in a touch panel in accordance with Embodiment 5.

Figure 15:
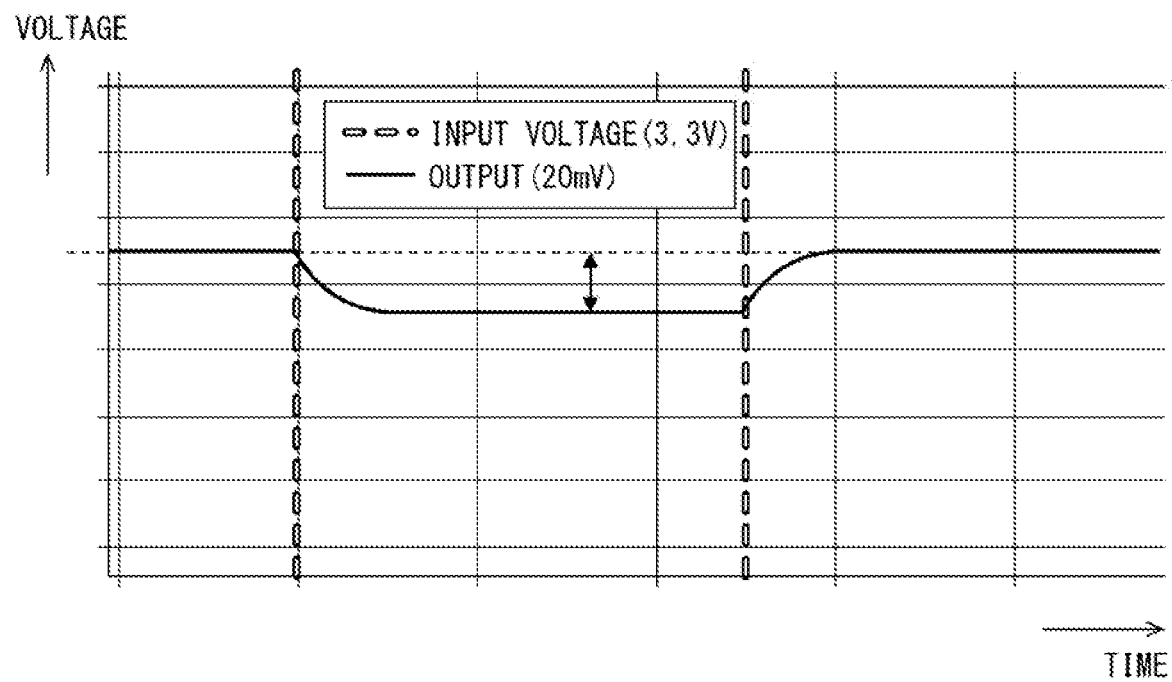

FIG. 15 is a graph showing a result of simulating change in resistance which change is caused when pressure is applied to a pressure detecting electrode that is provided in the touch panel.

Figure 16:
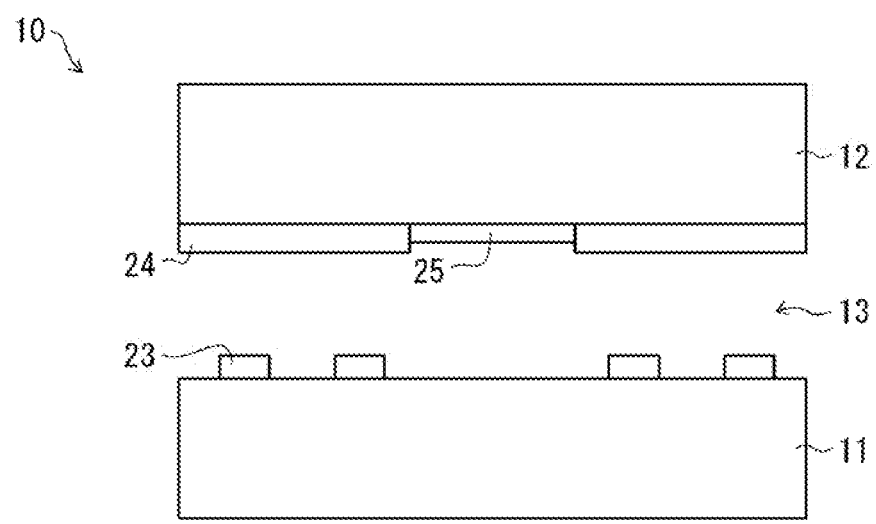

FIG. 16 is a cross-sectional view illustrating a configuration of a display panel in accordance with Embodiment 6.

Figure 17:
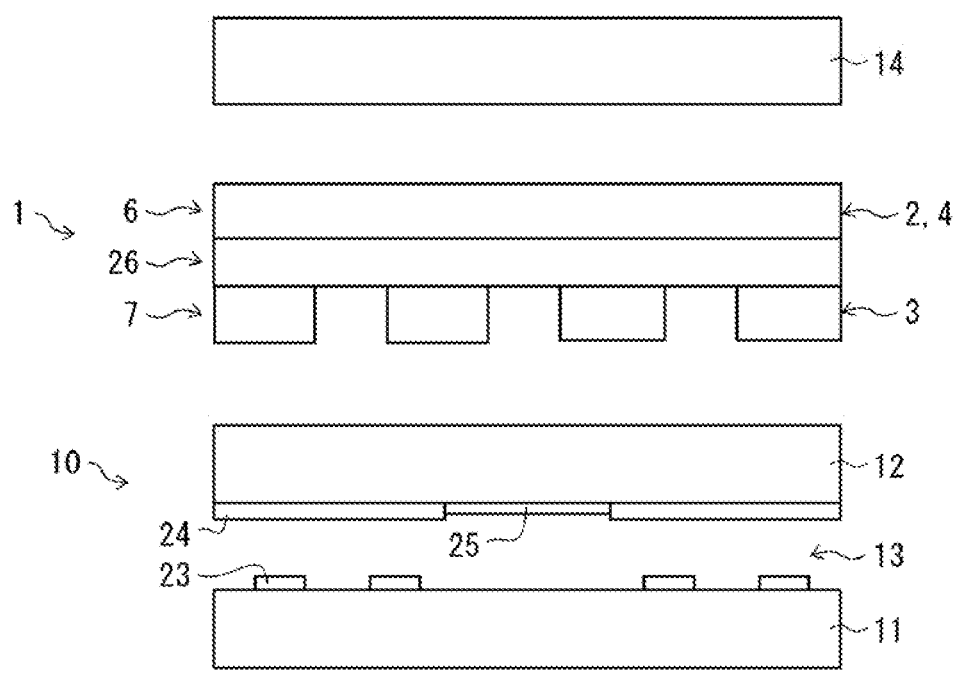

FIG. 17 is a cross-sectional view illustrating a configuration of a touch panel that is provided on the display panel.

DESCRIPTION OF EMBODIMENTS

The following description will discuss embodiments of the present invention in detail.

Embodiment 1

Figure 1:
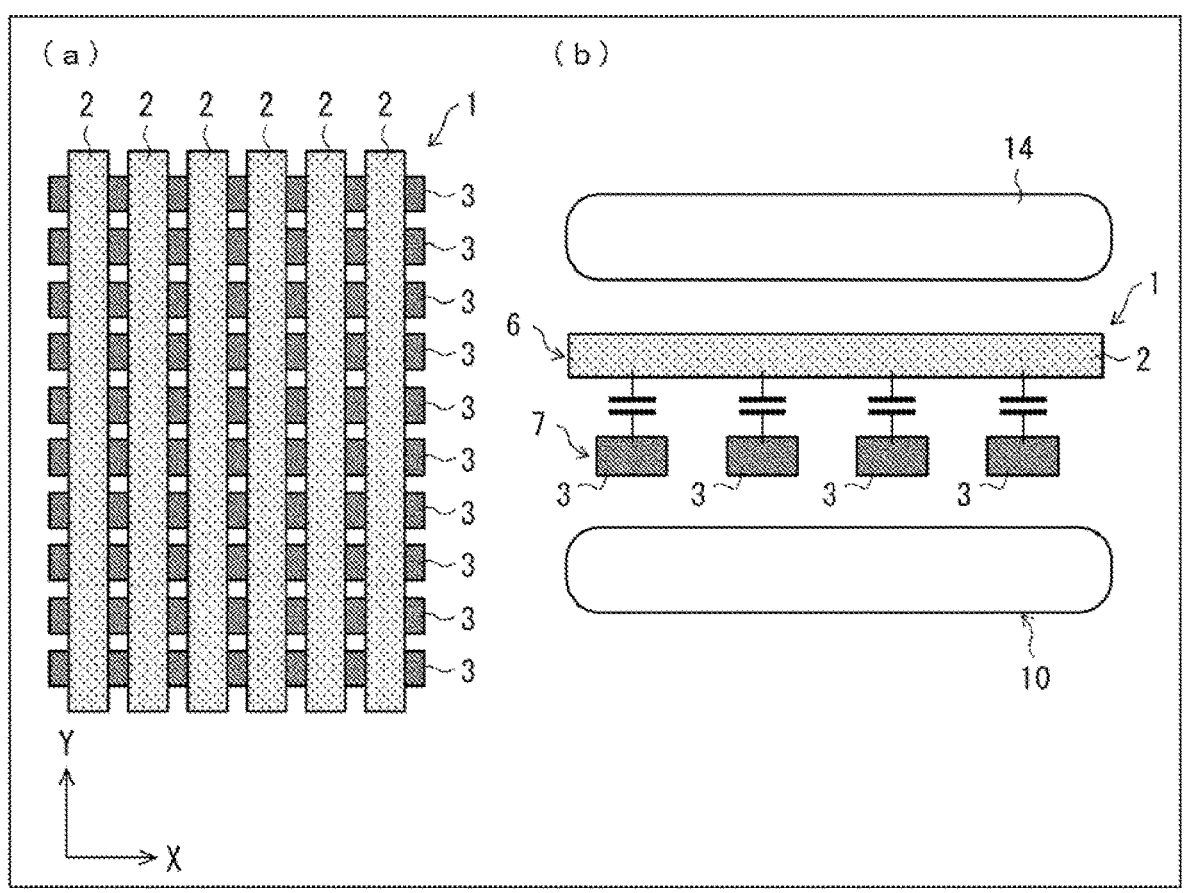

(a) of FIG. 1 is a plan view schematically illustrating a configuration of a touch panel 1 (capacitance type touch panel that has a built-in pressure sensor) in accordance with Embodiment 1, and (b) of FIG. 1 is a cross-sectional view illustrating the touch panel 1. The touch panel 1 is provided on a display panel 10. A cover glass 14 is provided so as to cover the touch panel 1.

The touch panel 1 includes a driving layer 7 and a sensing layer 6. A plurality of driving electrodes 3 which extend in parallel with each other in an X direction are provided in the driving layer 7. A plurality of sensing electrodes 2 (touch detecting electrode) which extend in parallel with each other in a Y direction are provided in the sensing layer 6. A plurality of capacitors are arranged in a matrix manner between (i) the plurality of driving electrodes 3 and (ii) the plurality of sensing electrodes 2.

In a case where a detection target has touched the cover glass 14, an electrostatic capacitance of a capacitor changes which is in the touch panel 1 and corresponds to a touch location. From this, the touch location of the detection target can be detected by reading out, from the sensing electrodes 2, signals which are based on electric charges that are accumulated in the capacitors due to application of driving voltages to the driving electrodes 3.

Figure 2:
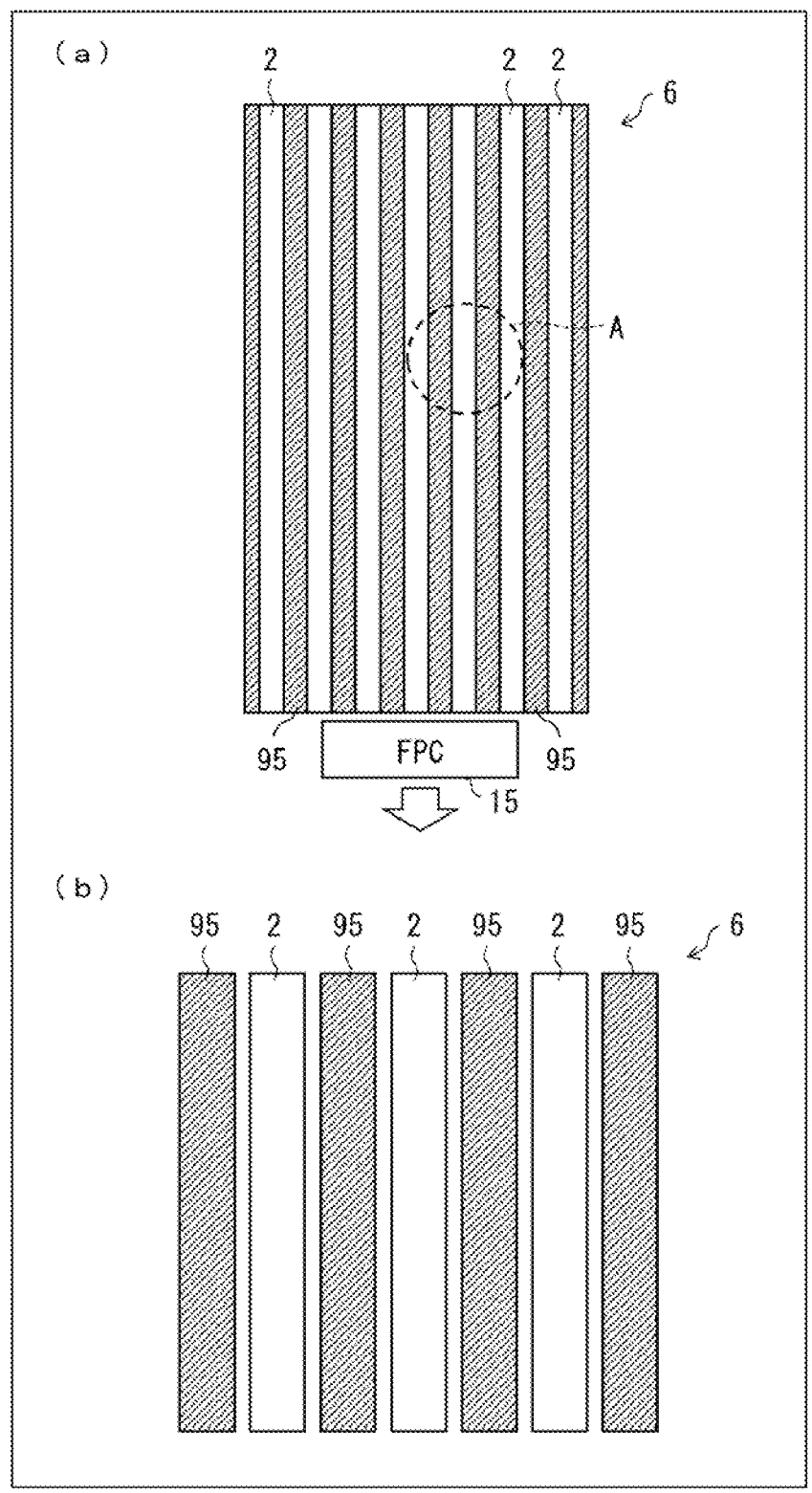

(a) of FIG. 2 is a plan view schematically illustrating a configuration of a sensing layer 6 that is provided in a touch panel in accordance with Comparative Example, and (b) of FIG. 2 is an enlarged view illustrating a part A indicated in (a) of FIG. 2. The electrodes provided in the sensing layer 6 for detecting a touch location include, in general, (i) sensing electrodes 2 which are connected via a flexible printed circuit (FPC) board 15 with a touch panel controller that is configured by an integrated circuit (IC) and (ii) dummy electrodes 95 each of which is provided between adjacent two of the sensing electrodes 2 for improving an appearance and is not connected with the touch panel controller.

Figure 3:
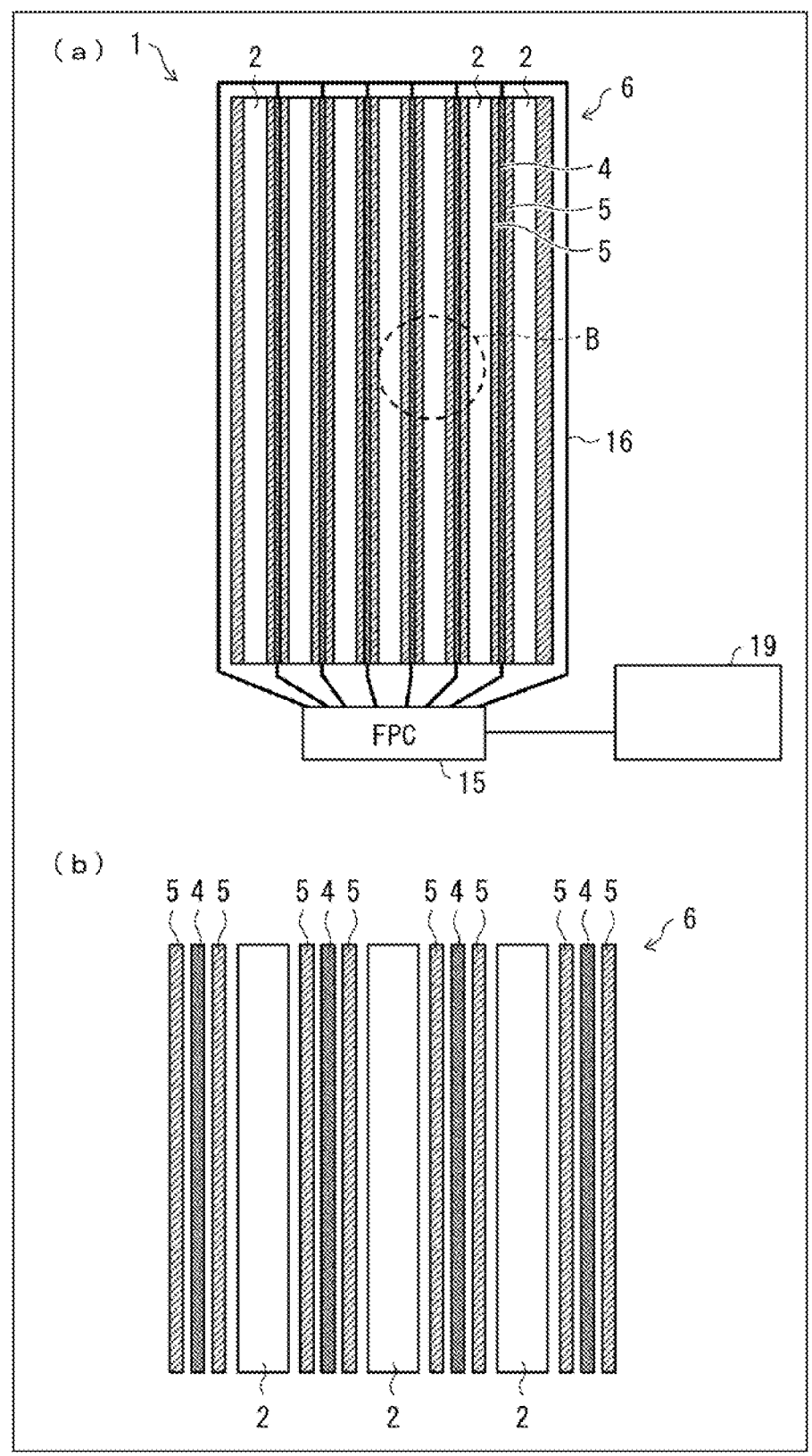

(a) of FIG. 3 is a plan view schematically illustrating a configuration of a sensing layer 6 that is provided in the touch panel 1 in accordance with Embodiment 1, and (b) of FIG. 3 is an enlarged view illustrating a part B indicated in (a) of FIG. 3. In Embodiment 1, some of dummy electrodes serve as pressure detecting electrodes 4 and are connected with the controller with which the sensing electrodes 2 are connected. Specifically, each of the pressure detecting electrodes 4 is provided between adjacent two of the sensing electrodes 2. Further, a dummy electrode 5 is provided between the pressure detecting electrode 4 and one of the adjacent two of the sensing electrodes 2, and another dummy electrode 5 is provided between the pressure detecting electrode 4 and the other of the adjacent two of the sensing electrodes 2. A width of each of the pressure detecting electrodes 4 is smaller than a width of each of the sensing electrodes 2. A width of each of the dummy electrodes 5 is identical with the width of each of the pressure detecting electrodes 4. The dummy electrodes 5, the pressure detecting electrodes 4, and the sensing electrodes 2 are made of the same material, i.e., indium tin oxide (ITO). The material of the pressure detecting electrodes 4 preferably has resistance which largely changes (i.e., has a high gauge factor) in response to a stress. For example, a semiconductor such as ITO is known to have a high gauge factor, and is suitable as a material of the pressure detecting electrode 4. In regard to the gauge factor of the semiconductor, a gauge factor of a polycrystal is higher than that of an amorphous material, and a gauge factor of a single crystal is higher than that of a polycrystal.

One end of each of the sensing electrodes 2 is connected with a touch panel controller 19 via the flexible printed circuit board 15. Both ends of each of the pressure detecting electrodes 4 are connected with drive wires 16, and are further connected with the touch panel controller 19 via the flexible printed circuit board 15. The dummy electrodes 5 are not connected with the touch panel controller 19.

An amplifier that is provided in the touch panel controller 19 is preferably a difference-type amplifier that amplifies a difference between two inputs. From this, it is possible to further noticeably detect change in resistance between the pressure detecting electrodes 4 when a stress is applied.

Electrodes for detecting a location which are provided in the sensing layer 6 include the sensing electrodes 2 which are connected with the touch panel controller 19 and the dummy electrodes 5 which are not connected with the touch panel controller 19. The electrodes for detecting a location are, in general, made up of a plurality of electrodes which extend in one direction in order to enhance detection accuracy. Moreover, each of the pressure detecting electrodes 4 is provided between adjacent two of the dummy electrodes 5. In a case where pressure is applied to a pressure detecting electrode 4 which is connected with the touch panel controller 19, resistance of the pressure detecting electrode 4 changes. Accordingly, a signal which is read out from the pressure detecting electrode 4 when sensing is carried out by the touch panel controller 19 changes as compared with a case where no pressure is applied. From this, pressure applied to the touch panel can be detected.

The sensing electrodes 2 for detecting a location and the pressure detecting electrodes 4 for detecting pressure are connected with the same touch panel driving IC (i.e., the touch panel controller 19). A touch location is detected based on change in mutual capacitance between the sensing electrodes 2 and the driving electrodes 3. Pressure is detected based on change in resistance of the pressure detecting electrode 4 which change is caused when a stress is applied to the pressure detecting electrode 4.

According to Embodiment 1, the pressure detecting electrodes 4 which are made of the same material as the sensing electrodes 2 for detecting a location are provided in the sensing layer 6 in which the sensing electrodes 2 are also provided. This makes it possible to eliminate excess process, costs, and mechanistic restriction for providing the pressure detecting electrodes 4.

The sensing electrodes 2 for detecting a location and the pressure detecting electrodes 4 are connected with the same touch panel controller 19. Therefore, it is unnecessary to separately provide a resistance measuring device and an electrostatic capacitance measuring device as different ICs as in Patent Literature 1. The pressure detecting electrodes 4 are provided separately from the sensing electrodes 2 which are provided for detecting a location, and it is therefore possible to simultaneously detect a location and pressure by simultaneously driving the pressure detecting electrodes 4 and the sensing electrodes 2.

Figure 4:
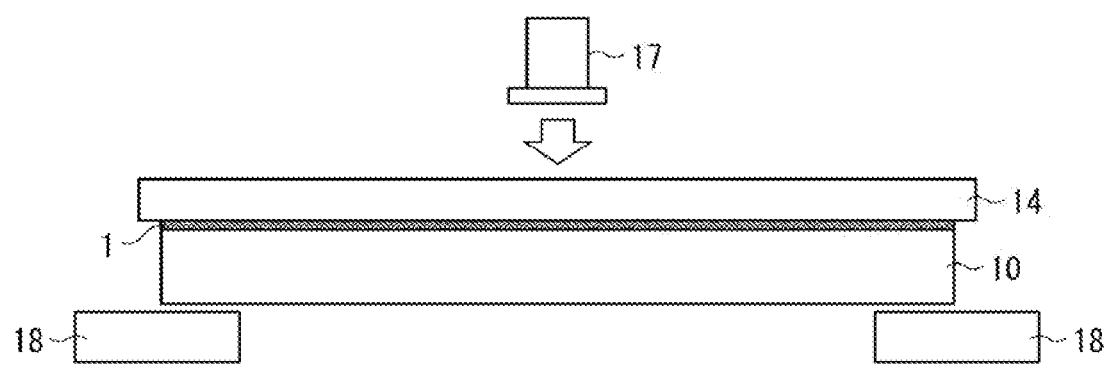
FIG. 4 is a view for explaining a method for measuring resistance of a pressure detecting electrode that is provided in the sensing layer.
Figure 5:
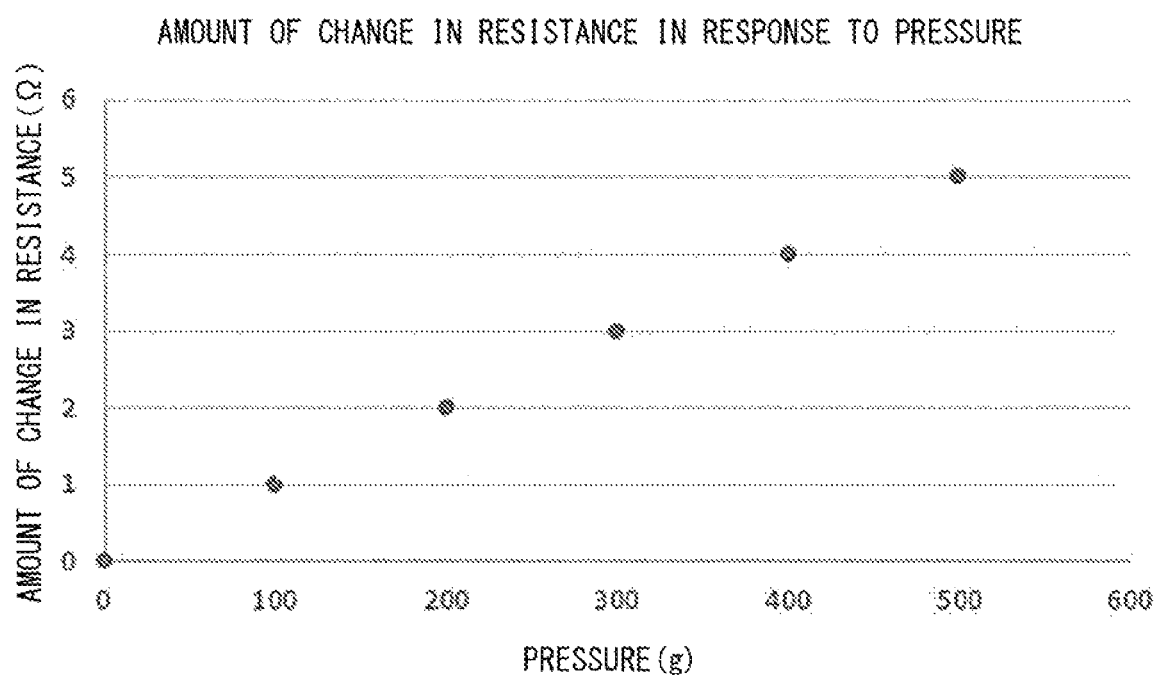
FIG. 5 is a graph showing a result of measuring resistance of the pressure detecting electrode.

FIG. 4 is a view for explaining a method for measuring resistance of a pressure detecting electrode 4 that is provided in the sensing layer 6. FIG. 5 is a graph showing a result of measuring resistance of the pressure detecting electrode 4. The display panel 10 on which the touch panel 1 and the cover glass 14 (having a thickness t of 0.55 mm) are mounted is fixed to a fixing member 18, then pressure is applied to the cover glass 14 with a pressure applying member 17, and then resistance of a pressure detecting electrode 4 which is provided in the touch panel 1 is measured.

Applied pressure is in proportion to an amount of change in resistance of the pressure detecting electrode 4 (see FIG. 5). Therefore, pressure applied to the touch panel 1 can be detected by measuring resistance of the pressure detecting electrode 4.

(a) of FIG. 6 is a circuit diagram for simulating change in resistance which change is caused when pressure is applied to the pressure detecting electrode 4, and (b) of FIG. 6 is a graph showing a result of the simulation. (b) of FIG. 6 shows a result of simulation in which, to a difference-type amplifier provided in the touch panel controller 19, change in resistance of the pressure detecting electrode 4 is inputted which change is caused when pressure of 300 g is applied to the pressure detecting electrode 4 under the following conditions: line resistance=1 kΩ; and input voltage=3.3 V. This shows that an output can be detected from change in resistance which is actually measured when pressure of 300 g is applied to the touch panel 1 on the display panel 10.

In Embodiment 1, the example has been described in which the pressure detecting electrodes 4 are provided in the sensing layer 6 in which the sensing electrodes 2 are also provided. Note, however, that the present invention is not limited to this example. The pressure detecting electrodes 4 can be provided in the driving layer 7 in which the driving electrodes 3 are also provided. The same applies to the subsequently described embodiments.

Embodiment 2

The following description will discuss another embodiment of the present invention with reference to FIGS. 7 through 9. For convenience of explanation, identical reference numerals are given to constituent members having functions identical with those of the constituent members described in the foregoing embodiment, and descriptions of such constituent members are omitted here.

(a) of FIG. 7 is a plan view schematically illustrating a configuration of a sensing layer 6 that is provided in a touch panel 1A in accordance with Embodiment 2, (b) of FIG. 7 is an enlarged view illustrating a configuration of a part C indicated in (a) of FIG. 7, and (c) of FIG. 7 is an enlarged view illustrating another configuration of the part C.

In Embodiment 2, a folded pattern section 8 is inserted into each of pressure detecting electrodes 4A in order to make change in resistance more noticeable when pressure is applied. Each of the pressure detecting electrodes 4A is configured by a bundle of three electrode lines so that resistance is lowered (see (b) of FIG. 7). The folded pattern section 8 in each of the pressure detecting electrodes 4A extends in a −Y direction by a folding length L and then extends in a −X direction by a length W. Further, the folded pattern section 8 extends in a Y direction by the folding length L, and then extends in the −X direction by the length W. Furthermore, the folded pattern section 8 extends in the −Y direction by the folding length L. As such, the folded pattern section 8 of each of the pressure detecting electrodes 4A extends alternately in the −Y direction and the Y direction in order to increase a rate of change in resistance which change is caused when pressure is applied. From this, a length of the pressure detecting electrode 4A in the longitudinal direction increases, and this makes it possible to increase a rate of change in resistance of the pressure detecting electrode 4A which change is caused when pressure is applied.

In the example illustrated in (a) of FIG. 7, the folded pattern section 8 is provided in the vicinity of a middle part in the longitudinal direction of each of all the pressure detecting electrodes 4A. Note, however, that the present invention is not limited to this example. In a case where a difference-type amplifier is used, it is possible to more noticeably detect change in resistance by shifting locations of the folded pattern sections 8 in respective lines.

In the above example, the folded pattern section 8 extends linearly. Note, however, that the present invention is not limited to this. In order to improve viewability, the folded pattern section 8 can be configured to extend in an irregular shape as illustrated in (c) of FIG. 7.

(a) of FIG. 8 is a schematic view illustrating a deformation state of the pressure detecting electrode 4 when a stress is applied to the pressure detecting electrode that is provided in the sensing layer 6, (b) of FIG. 8 is a view for explaining an amount of change in resistance of the pressure detecting electrode in accordance with Comparative Example, and (c) of FIG. 8 is a view for explaining an amount of change in resistance of the pressure detecting electrode in accordance with Embodiment 2.

By inserting the folded pattern section 8, a length of the pressure detecting electrode in the longitudinal direction increases, and a rate of change in resistance in response to a stress increases. Moreover, electrode lines are connected in parallel in each of a part in front of and a part behind the folded pattern section 8, and this makes it possible to lower resistance of the entire pressure detecting electrode, and it is possible to further increase a rate of change.

In the examples illustrated in FIG. 7 and FIG. 8, the number of folds of the folded pattern section 8 is three. Note, however, that the present invention is not limited to those examples. The number of folds can vary depending on an actual pattern.

In a case where the folding length L is long, change in resistance increases and resistance itself also increases. Therefore, the folding length L of the pressure detecting electrode 4A and the resistance of the pressure detecting electrode 4A are in a relation of trade-off.

(a) of FIG. 9 is a circuit diagram for simulating change in resistance which change is caused when pressure is applied to the pressure detecting electrode 4A, and (b) of FIG. 9 is a graph showing a result of the simulation. (b) of FIG. 9 shows a result of simulation in which, to a difference-type amplifier, change in resistance is inputted which change is caused when pressure of 300 g is applied to the pressure detecting electrode 4A under the following conditions: line resistance=1 kΩ; and input voltage=3.3 V. A folded pattern in the pressure detecting electrode 4A is a pattern in which the electrode is folded three times as with the patterns illustrated in FIG. 7 and FIG. 8. Here, (b) of FIG. 9 shows a result of simulation that is carried out under simple conditions in which the resistance becomes ⅓ and the amount of change in resistance is tripled.

Embodiment 3

(a) of FIG. 10 is a plan view schematically illustrating a configuration of a sensing layer 6 that is provided in a touch panel in accordance with Embodiment 3, (b) of FIG. 10 is an enlarged view illustrating a configuration of a part D indicated in (a) of FIG. 10, and (c) of FIG. 10 is an enlarged view illustrating another configuration of the part D. For convenience of explanation, identical reference numerals are given to constituent members having functions identical with those of the constituent members described in the foregoing embodiments, and descriptions of such constituent members are omitted here.

In order to make change in resistance further noticeable when pressure is applied to the pressure detecting electrode as compared with Embodiment 2, in Embodiment 3, not only the pressure detecting electrode but also dummy electrodes provided on both sides of the pressure detecting electrode are partially used as a folded pattern. This makes it possible to increase the number of folds as compared with Embodiment 2.

The change in resistance of the pressure detecting electrode increases depending on the number of folds, and therefore the amount of change in resistance due to a stress increases.

In a case where a difference-type amplifier is used, it is possible to more noticeably detect change in resistance by shifting locations of the folded patterns in respective lines.

Each of the pressure detecting electrodes 4B is provided between sensing electrodes 2. In practice, a pattern is employed in which each of the pressure detecting electrodes 4B is provided between dummy electrodes 5B.

As illustrated in (b) of FIG. 10, three dummy electrodes 5B are provided between each pressure detecting electrode 4B and each sensing electrode 2. Each of the pressure detecting electrodes 4B has a folded pattern section 8B. As such, a part of the pressure detecting electrode 4B can be changed into the folded pattern section 8B. The number of folds of the folded pattern section 8B depends on the number of electrode lines included in one pressure detecting electrode 4B. For example, in a case where the pressure detecting electrode 4B is configured by three electrode lines which are connected in parallel (see (b) of FIG. 10), the number of folds of the folded pattern section 8B is restricted to three.

As illustrated in (c) of FIG. 10, a part of the folded pattern section 8B can be formed by changing parts of the dummy electrodes 5B. As such, parts of the dummy electrodes 5B and the pressure detecting electrode 4B can be changed into the folded pattern section 8B. The number of folds of the folded pattern section 8B does not depend on the number of electrode lines included in one pressure detecting electrode 4B. For example, even in a case where the pressure detecting electrode 4B is configured by three electrode lines which are connected in parallel (see (c) of FIG. 10), the number of folds of the folded pattern section 8B is not restricted to three and can be four or more. (c) of FIG. 10 shows an example in which the number of folds is five.

Embodiment 4

FIG. 11 is a plan view schematically illustrating a configuration of a sensing layer 6 that is provided in a touch panel 1C in accordance with Embodiment 4. FIG. 12 is a circuit diagram illustrating a configuration of a Wheatstone bridge circuit 9 that is provided in the touch panel 1C. For convenience of explanation, identical reference numerals are given to constituent members having functions identical with those of the constituent members described in the foregoing embodiments, and descriptions of such constituent members are omitted here.

In Embodiment 4, a Wheatstone bridge circuit 9 is provided between the touch panel 1C and the touch panel controller 19, in addition to the configuration of Embodiment 1, 2, or 3. From this, change in resistance is made noticeable and then a signal is inputted to the touch panel controller 19, and this makes it possible to more easily detect pressure.

The Wheatstone bridge circuit 9 includes a resistor Rg1 (second resistor) that is connected with a terminal Q via a terminal C and connected with a terminal P via a terminal D, a resistor Rg2 (third resistor) that is connected with the terminal P and a terminal S, a resistor Rg3 (fourth resistor) that is connected with a terminal R and the terminal S, and a resistor Rg4 (first resistor) that is connected with the terminal Q via a terminal A and connected with the terminal R via a terminal B.

An input voltage E is applied to the terminal Q and the terminal S from the touch panel controller 19, and the touch panel controller 19 reads out outputs e0 from the terminal P and the terminal R.

Here, an example is shown in which a pressure detecting electrode 4 that is provided in a central part on which an influence by an applied stress is larger is connected as an active gauge (resistor Rg1) with the terminal C and the terminal D via drive wires 21, and a dummy electrode 5 that is provided in an edge part on which an influence by an applied stress is smaller is connected as a dummy gauge (resistor Rg4) with the terminal A and the terminal B via drive wires 20.

As a principle of strain gauge, in a case where a strain ε is generated in a target object, a relation between the strain ε and resistance R is represented by the following formula:

$$K \times \varepsilon = \Delta R/R$$

where K is a gauge factor which is a value peculiar to a material.

In a case where all resistance values of the resistors Rg1 through Rg4 in the Wheatstone bridge circuit 9 illustrated in FIG. 12 are identical with each other, the output e0 represents 0 [V] based on the following formula:

$$e=((Rg1 \times Rg3)-(Rg2 \times Rg4))/(Rg1+Rg2)/(Rg3+Rg4) \times E$$

However, in a case where the resistor Rg1 is changed due to application of a stress, e≠0 [V] becomes true, and this indicates that an electric current flows.

By connecting a terminal M and a terminal N to the touch panel controller 19, it is possible to detect change in the electric current value, and this makes it possible to detect pressure.

In a case where the touch panel controller 19 in which a differential-type amplifier is provided is used, it is possible to further amplify a signal by providing capacitors Cs that come before inputs of the touch panel controller 19 as illustrated in FIG. 12.

As such, the case where the specific pressure detecting electrodes 4, the dummy electrodes 5, and the Wheatstone bridge circuit 9 are used is effective for a case where change in resistance is extremely small. In particular, in a case where resistance of ITO is high, a rate of change in resistance becomes lower but pressure can be detected by providing the Wheatstone bridge circuit 9.

Moreover, in a case where two of the four resistors in the Wheatstone bridge circuit 9 are respectively the pressure detecting electrode 4 and the dummy electrode 5 in the touch panel, it is possible to obtain compensation with respect to change in temperature.

Instead of the dummy electrode 5 that is provided in the edge part on which an influence by an applied stress is smaller, it is possible to connect a pressure detecting electrode 4 which is provided in the edge part to the terminal A and the terminal B as a dummy gauge (resistor Rg4). In a case where an electrode pattern is employed which (i) is formed in the sensing layer 6 in which the sensing electrodes 2 are also provided, (ii) is made of the same material as the sensing electrodes 2, and (iii) has the same resistance as the sensing electrodes 2, a location at which an electrode to be connected with the terminal A and the terminal B as a dummy gauge (resistor Rg4) is provided can be either inside or outside of a sensor area. An electrode pattern which is provided outside of the sensor area and on which an influence by an applied stress is smaller can be connected to the terminal A and the terminal B as a dummy gauge (resistor Rg4). In a case where temperature compensation is not provided, the electrode pattern does not need to be provided in the same sensing layer 6 and made of the same material as the sensing electrodes 2. Note, however, that, as long as the circuit serves as a Wheatstone bridge circuit, the electrode pattern essentially has a resistance value identical with those of the resistors Rg2 and Rg3.

(a) of FIG. 13 is a circuit diagram for simulating change in resistance which change is caused when pressure is applied to a pressure detecting electrode 4 that is provided in the touch panel 1C, and (b) of FIG. 13 is a graph showing a result of the simulation. (b) of FIG. 13 shows a result of simulation in which, to a difference-type amplifier, change in resistance is inputted which change is caused when pressure of 300 g is applied to the pressure detecting electrode 4 under the following conditions: line resistance=1 kΩ; and input voltage=3.3 V. In the folded pattern, the number of folds is three. Here, (b) of FIG. 13 shows a result of simulation that is carried out under simple conditions in which the amount of change in resistance is tripled.

In a case where the Wheatstone bridge circuit 9 is used, an amplification factor of an output is determined based on the capacitors Cs indicated in FIG. 12 and an integral capacitor that is provided inside the touch panel controller 19. Here, the amplification factor is assumed to be twice but the amplification factor can vary depending on line resistance and an IC restriction.

Embodiment 5

FIG. 14 is a plan view schematically illustrating a configuration of a sensing layer 6 that is provided in a touch panel 1D in accordance with Embodiment 5. For convenience of explanation, identical reference numerals are given to constituent members having functions identical with those of the constituent members described in the foregoing embodiments, and descriptions of such constituent members are omitted here.

Embodiment 5 shows a pattern in which all pressure detecting electrodes 4 in the entire touch panel 1D are connected with a Wheatstone bridge circuit 9 (see FIG. 12) via drive wires 22 so that applied pressure can be detected anywhere in the entire touch panel 1D based on a difference. Moreover, all the pressure detecting electrodes 4 are bundled, and this makes it possible to lower resistance itself of a gauge (resistor Rg1) of the Wheatstone bridge circuit 9.

In this example, a dummy electrode 5 which is provided in an edge part and is less likely to be influenced is used as a dummy gauge, and the other resistors Rg2 and Rg3 of the Wheatstone bridge circuit 9 are connected outside of the panel.

In a case where the touch panel controller 19 in which a differential-type amplifier is provided is used, it is possible to further amplify a signal by providing capacitors Cs that come before inputs of the touch panel controller 19 as illustrated in FIG. 12.

In a case where the Wheatstone bridge circuit 9 is provided as illustrated in FIG. 12, change in resistance of the dummy electrode 5 which is provided in the edge part of the panel and on which an influence by pressure is smaller is seen as compared with change in resistance of all the pressure detecting electrodes 4 which exist in the entire touch panel 1D. This brings about an advantage that a difference can be seen by applying pressure at any location in the entire touch panel 1D. All the pressure detecting electrodes 4 which exist in the entire touch panel 1D are bundled, and therefore resistance decreases and also a rate of change in resistance decreases. From this, it is preferable to provide capacitors Cs for amplification.

Moreover, the above configuration brings about another advantage of reducing the number of channels to be connected with the IC (i.e., the touch panel controller 19).

FIG. 15 is a graph showing a result of simulating change in resistance which change is caused when pressure is applied to a pressure detecting electrode 4 that is provided in the touch panel 1D.

FIG. 15 shows a result of simulation in which, to a difference-type amplifier, change in resistance is inputted which change is caused when pressure of 300 g is applied to the pressure detecting electrode 4 under the following conditions: line resistance=1 kΩ; and input voltage=3.3 V. In the folded pattern, the number of folds is three. Here, FIG. 15 shows a result of simulation that is carried out under simple conditions in which the amount of change in resistance is tripled because the number of folds is three and becomes ⅙ because the number of electrode lines is six in each of a part in front of and a part behind the folded pattern section 8. In a case where the Wheatstone bridge circuit 9 is used, an amplification factor of an output is determined by capacitors Cs and an integral capacitor Cint inside the touch panel controller 19. Here, the amplification factor is assumed to be thirtyfold but the amplification factor can vary depending on line resistance and an IC restriction.

Embodiment 6

FIG. 16 is a cross-sectional view illustrating a configuration of a display panel 10 in accordance with Embodiment 6. FIG. 17 is a cross-sectional view illustrating a configuration of a touch panel 1 that is provided on the display panel 10.

As a configuration of a general liquid crystal panel, a thin film transistor (TFT) substrate 11 and a color filter (CF)

substrate 12 are configured as illustrated in FIG. 16, and the CF substrate 12 and the TFT substrate 11 are arranged in this order from a viewed surface side.

A liquid crystal layer 13 is provided between the CF substrate 12 and the TFT substrate 11. On the TFT substrate 11, TFTs 23 are provided. CFs 24 and a black matrix 25 are provided on the CF substrate 12 on a side on which the liquid crystal layer 13 is provided.

The configuration illustrated in FIG. 16 is called a liquid crystal (LC) module, and the touch panel 1 can be mainly provided at any of the three locations, that is, on (outside) the LC module, on the CF substrate 12, or in the LC module.

Here, in a case where change in resistance of a pressure detecting electrode 4 which change is caused by applied pressure is to be detected, it is advantageous to provide the pressure detecting electrode 4 on a side that is more likely to be influenced by touch, that is, on a side that is closer to the viewed surface. Therefore, the pressure detecting electrode 4 is preferably provided closer to the viewed surface side, as compared with the CF substrate 12.

As an example, FIG. 17 illustrates an out-cell type touch panel 1 in which electrodes are provided on (outside) a LC module. In this example, a mutual capacitance type touch panel is described, and therefore two touch panel electrode layers, i.e., a driving layer 7 and a sensing layer 6 are provided on both surfaces of a film substrate layer 26 (see FIG. 17). In Embodiment 6, pressure detecting electrodes 4 which are made of the same material as sensing electrodes 2 are provided in the sensing layer 6 in which the sensing electrodes 2 are also provided. In this case, the pressure detecting electrodes 4 are provided immediately below a cover glass 14 which serves as a touch surface, and therefore the pressure detecting electrodes 4 are more likely to be influenced by a stress, and this makes it easier to detect change in resistance.

[Recap]

A capacitance type touch panel (touch panel 1, 1A, 1B, 1C, 1D) that has a built-in pressure sensor in accordance with an aspect 1 of the present invention includes: a plurality of touch detecting electrodes (sensing electrodes 2, driving electrodes 3) that extend in a first direction for detecting a touch location based on an electrostatic capacitance; and pressure detecting electrodes (4, 4A, 4B) each of which extends in the first direction and is provided between adjacent two of the plurality of touch detecting electrodes (sensing electrodes 2, driving electrodes 3), each of the pressure detecting electrodes (4, 4A, 4B) having a width smaller than that of each of the plurality of touch detecting electrodes (sensing electrodes 2, driving electrodes 3) and having resistance that changes in response to applied pressure.

According to the configuration, a touch location is detected based on the plurality of touch detecting electrodes, and applied pressure is detected based on the pressure detecting electrodes each of which is provided between adjacent two of the plurality of touch detecting electrodes. This makes it possible to simultaneously detect a location of an electric conductor and pressure that is applied by the electric conductor. Moreover, the width of each of the pressure detecting electrodes which is provided between adjacent two of the plurality of touch detecting electrodes is smaller than that of each of the touch detecting electrodes, and it is therefore possible to simultaneously detect the applied pressure and a touch location while maintaining resolving power of detecting the touch location by the touch detecting electrodes.

According to the capacitance type touch panel (touch panel 1, 1A, 1B, 1C, 1D) in accordance with an aspect 2 of the present invention, it is possible in the aspect 1 that the plurality of touch detecting electrodes (sensing electrodes 2, driving electrodes 3) are respectively sensing electrodes (2); the sensing electrodes (2) and the pressure detecting electrodes (4, 4A, 4B) are provided in a sensing layer (6); and a plurality of driving electrodes (3) that extend in a second direction are provided in a driving layer (7), the second direction intersecting with the first direction.

According to the configuration, it is possible to detect pressure by the pressure detecting electrodes which are provided in the sensing layer in which the sensing electrodes are also provided.

According to the capacitance type touch panel (touch panel 1, 1A, 1B, 1C, 1D) in accordance with an aspect 3 of the present invention, it is possible in the aspect 1 or 2 that: a dummy electrode (5, 5B) which extends in the first direction is provided between each of the pressure detecting electrodes (4, 4A, 4B) and each of the plurality of touch detecting electrodes (sensing electrodes 2, driving electrodes 3); and the dummy electrode (5, 5B), the pressure detecting electrodes (4, 4A, 4B), and the plurality of touch detecting electrodes (sensing electrodes 2, driving electrodes 3) are made of the same material.

According to the configuration, the pressure detecting electrodes for detecting pressure are made of the same material as the touch detecting electrodes for detecting a location and the dummy electrodes, and the pressure detecting electrodes are provided in the same layer as the touch detecting electrodes and the dummy electrodes. This makes it possible to eliminate excess process, costs, and mechanistic restriction.

According to the capacitance type touch panel (touch panel 1A, 1B, 1C, 1D) in accordance with an aspect 4 of the present invention, it is possible in any one of the aspects 1 through 3 that each of the pressure detecting electrodes (4A, 4B) has a folded pattern section (8, 8B) that extends alternately in the first direction and a third direction in order to increase a rate of change in resistance that changes in response to the applied pressure, the third direction being opposite to the first direction.

According to the configuration, the folded pattern section is provided in each of the pressure detecting electrodes, and this increases a length of the pressure detecting electrode in the longitudinal direction. This makes it possible to increase a rate of change in resistance that changes in response to pressure applied to the pressure detecting electrode.

According to the capacitance type touch panel (touch panel 1B, 1C, 1D) in accordance with an aspect 5 of the present invention, it is possible in the aspect 3 that each of the pressure detecting electrodes (4B) has a folded pattern section (8B) that extends alternately in the first direction and a third direction in order to increase a rate of change in resistance that changes in response to the applied pressure, the third direction being opposite to the first direction; and a part of the folded pattern section (8B) is formed by changing a part of the dummy electrode (5B).

According to the configuration, it is possible to increase the number of folds in the folded pattern section, and this can cause change in resistance in response to applied pressure to be further noticeable.

The capacitance type touch panel (touch panel 1C, 1D) in accordance with an aspect 6 of the present invention further includes, in the aspect 3, a Wheatstone bridge circuit (9) having a first resistor (resistor Rg4), a second resistor (resistor Rg1), a third resistor (resistor Rg2), and a fourth resistor (resistor Rg3), the first resistor (resistor Rg4) being connected with the dummy electrode (5), and the second resistor (resistor Rg1) being connected to the pressure detecting electrode (4).

According to the configuration, change in resistance is made to be noticeable by the Wheatstone bridge circuit and is then inputted to the touch panel controller, and this makes it possible to more easily detect pressure.

According to the capacitance type touch panel (touch panel 1, 1A, 1B, 1C, 1D) in accordance with an aspect 7 of the present invention, it is possible in any one of the aspects 2 through 6 that the capacitance type touch panel (touch panel 1, 1A, 1B, 1C, 1D) is provided in a display panel (10); the display panel (10) includes a TFT substrate (11), a CF substrate (12), and a liquid crystal layer (13) which is provided between the TFT substrate (11) and the CF substrate (12); the driving layer (7) is provided on the CF substrate (12) on a side opposite to the liquid crystal layer (13); and the sensing layer (6) is provided on the driving layer (7) on a side opposite to the liquid crystal layer (13).

According to the configuration, the pressure detecting electrodes can be provided immediately below a cover glass which serves as a touch surface, and therefore the pressure detecting electrodes are more likely to be influenced by a stress, and this makes it easier to detect change in resistance.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: Touch panel (capacitance type touch panel that has a built-in pressure sensor)
2: Sensing electrode (touch detecting electrode)
3: Driving electrode
4: Pressure detecting electrode
5: Dummy electrode
6: Sensing layer
7: Driving layer
8: Folded pattern section
9: Wheatstone bridge circuit
10: Display panel
11: TFT substrate
12: CF substrate
13: Liquid crystal layer
Rg1: Resistor (second resistor)
Rg2: Resistor (third resistor)
Rg3: Resistor (fourth resistor)
Rg4: Resistor (first resistor)

The invention claimed is:

1. A capacitance type touch panel that has a built-in pressure sensor, said capacitance type touch panel comprising:
a plurality of touch detecting electrodes that extend in a first direction for detecting a touch location based on an electrostatic capacitance; and
pressure detecting electrodes each of which extends in the first direction and is provided between adjacent two of the plurality of touch detecting electrodes, each of the pressure detecting electrodes having a width smaller than that of each of the plurality of touch detecting electrodes and having resistance that changes in response to applied pressure,
wherein each of the pressure detecting electrodes has a folded pattern section that extends alternately in the first direction and a third direction in order to increase a rate of change in resistance that changes in response to the applied pressure, the third direction being opposite to the first direction.

2. The capacitance type touch panel as set forth in claim 1, wherein:
the plurality of touch detecting electrodes are respectively sensing electrodes;
the sensing electrodes and the pressure detecting electrodes are provided in a sensing layer; and
a plurality of driving electrodes that extend in a second direction are provided in a driving layer, the second direction intersecting with the first direction.

3. The capacitance type touch panel as set forth in claim 1, wherein:
a dummy electrode which extends in the first direction is provided between each of the pressure detecting electrodes and each of the plurality of touch detecting electrodes; and
the dummy electrode, the pressure detecting electrodes, and the plurality of touch detecting electrodes are made of the same material.

4. The capacitance type touch panel as set forth in claim 3, wherein:
each of the pressure detecting electrodes has a folded pattern section that extends alternately in the first direction and a third direction in order to increase a rate of change in resistance that changes in response to the applied pressure, the third direction being opposite to the first direction; and
a part of the folded pattern section is formed by changing a part of the dummy electrode.

5. The capacitance type touch panel as set forth in claim 3, further comprising:
a Wheatstone bridge circuit having a first resistor, a second resistor, a third resistor, and a fourth resistor,
the first resistor being connected with an electrode that is provided at a location on which an influence by the applied pressure is smaller, and the second resistor being connected to a pressure detecting electrode that is provided at a location on which an influence by the applied pressure is larger.

6. The capacitance type touch panel as set forth in claim 1, wherein:
said capacitance type touch panel is provided in a display panel;
the display panel includes a TFT substrate, a CF substrate, and a liquid crystal layer which is provided between the TFT substrate and the CF substrate;
the driving layer is provided on the CF substrate on a side opposite to the liquid crystal layer; and
the sensing layer is provided on the driving layer on a side opposite to the liquid crystal layer.

* * * * *